Figure 1:
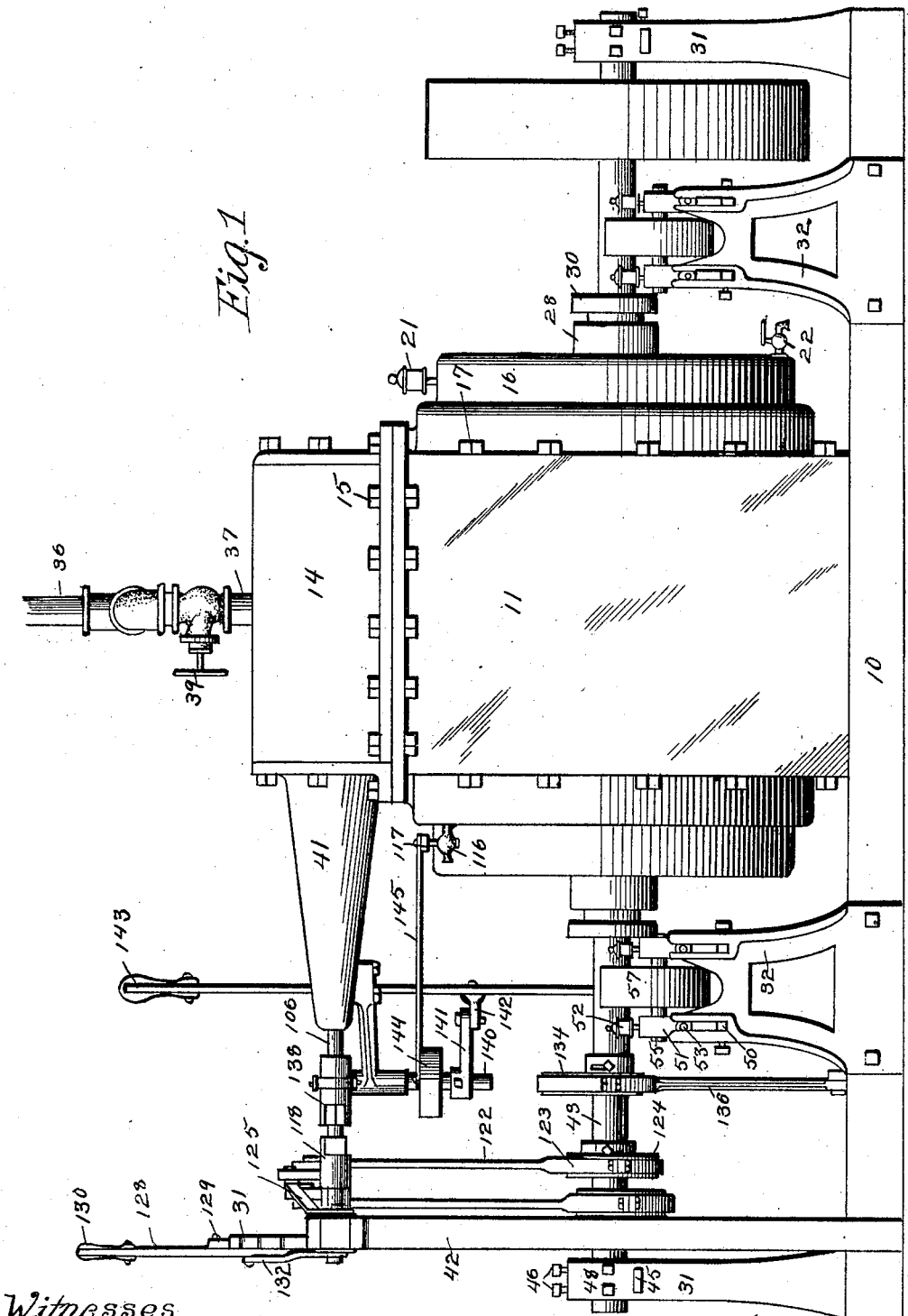

No. 828,259. PATENTED AUG. 7, 1906.
O. WILLIAMS.
ROTARY ENGINE.
APPLICATION FILED JAN. 7, 1905.

6 SHEETS—SHEET 1.

Witnesses
A. G. Hague.
S. F. Christy.

Inventor Orin Williams
By Irving T. Lane Attys

THE NORRIS PETERS CO., WASHINGTON, D. C.

No. 828,259. PATENTED AUG. 7, 1906.
O. WILLIAMS.
ROTARY ENGINE.
APPLICATION FILED JAN. 7, 1905.
6 SHEETS—SHEET 2.
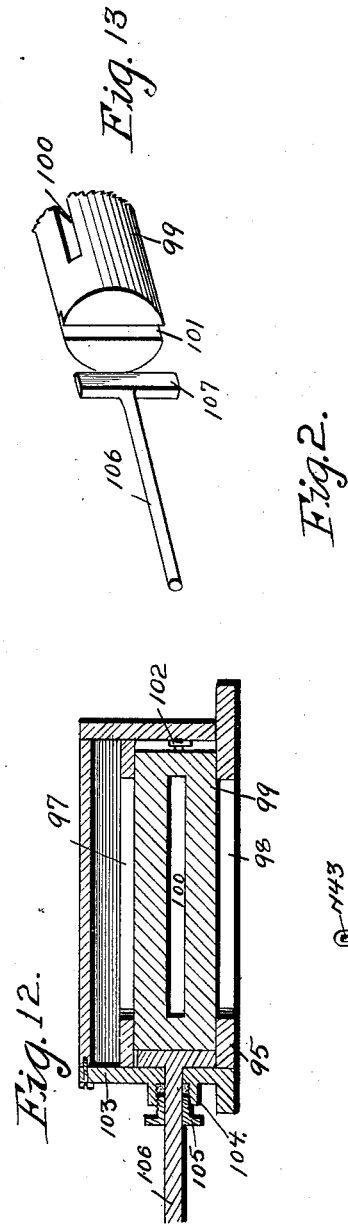
Fig. 13.
Fig. 12.
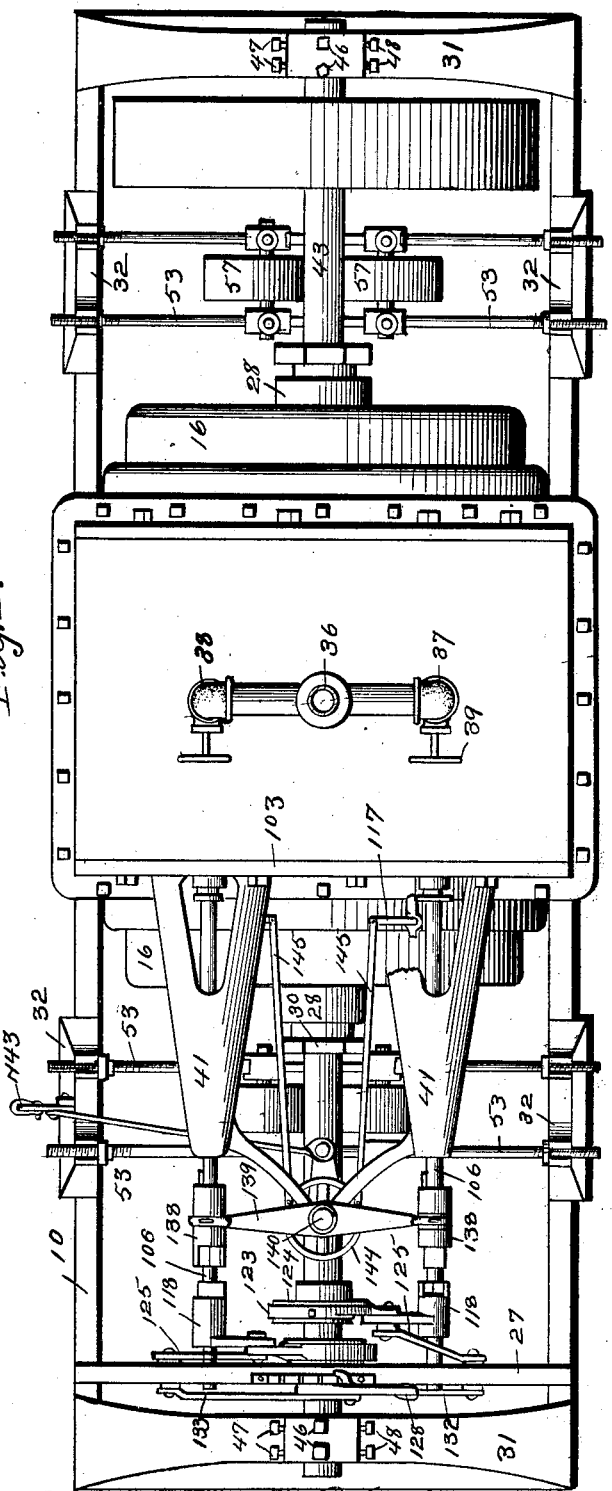
Fig. 2.
Witnesses
A. G. Hague
S. F. Christy.
Inventor Orin Williams
By Orwig & Lane Attys

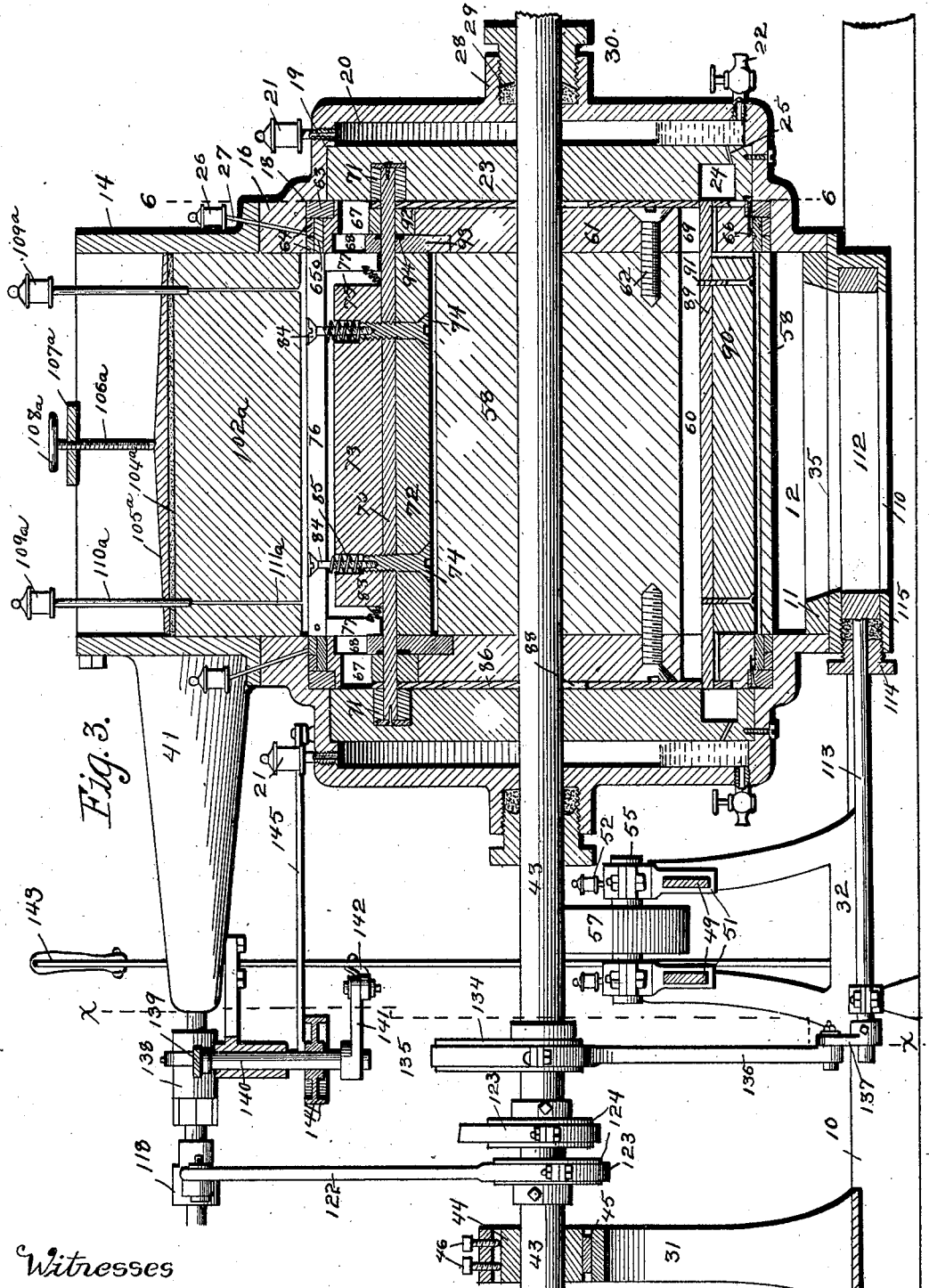

No. 828,259. PATENTED AUG. 7, 1906.
O. WILLIAMS.
ROTARY ENGINE.
APPLICATION FILED JAN. 7, 1905.
6 SHEETS—SHEET 4.
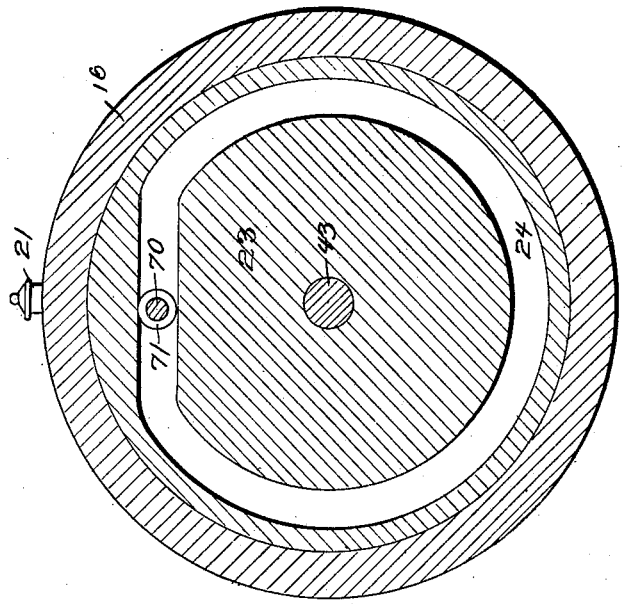
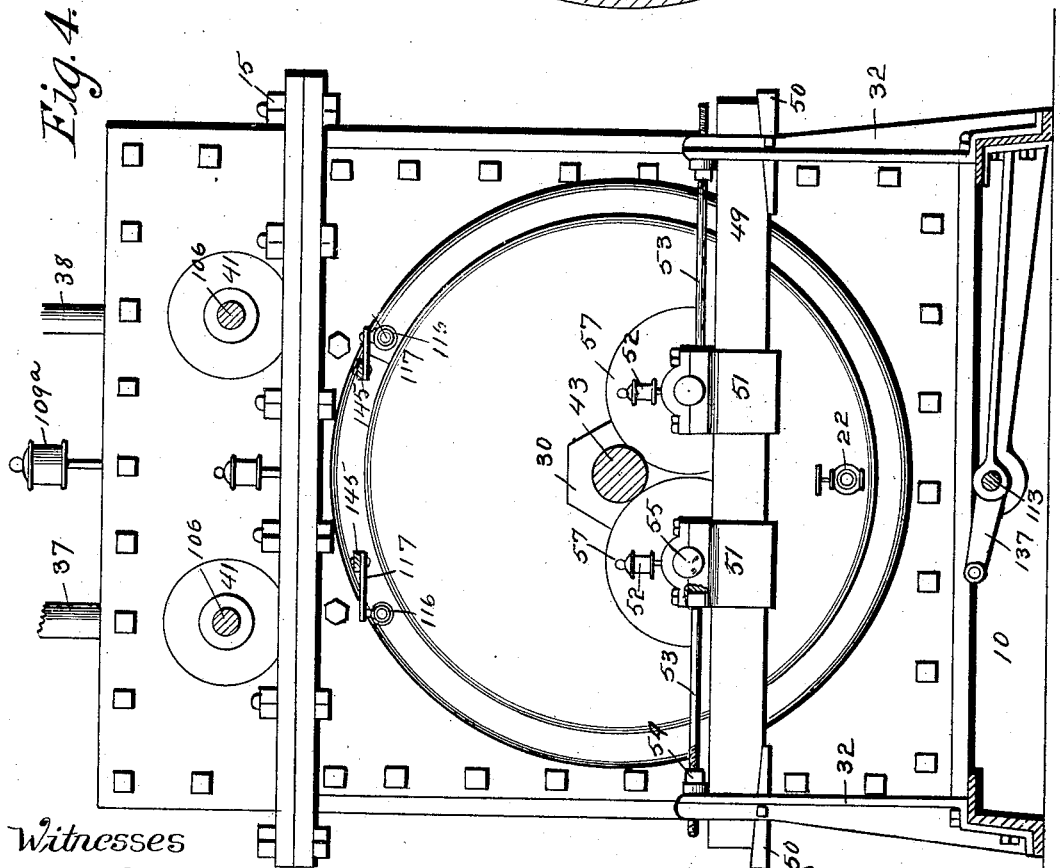
Witnesses
A. G. Hague
S. F. Christy.
Inventor Orin Williams
By Orwig & Lane Attys No. 828,259. PATENTED AUG. 7, 1906.
O. WILLIAMS.
ROTARY ENGINE.
APPLICATION FILED JAN. 7, 1905.
6 SHEETS—SHEET 5.
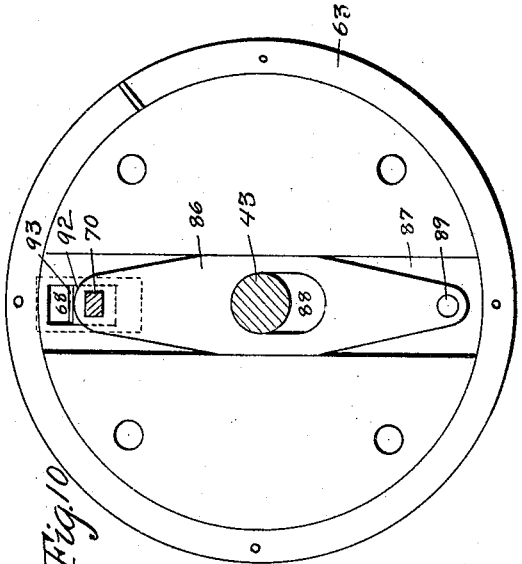
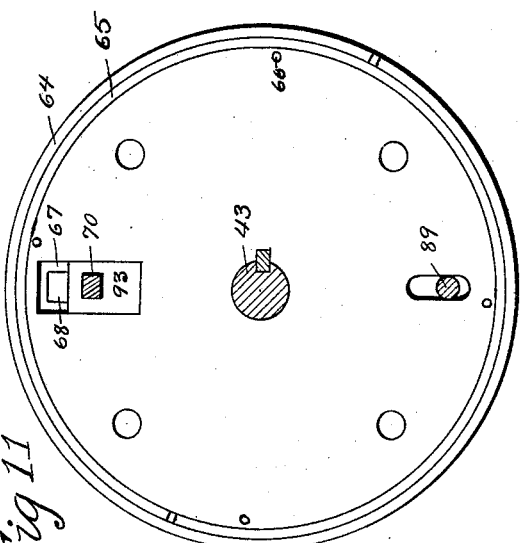
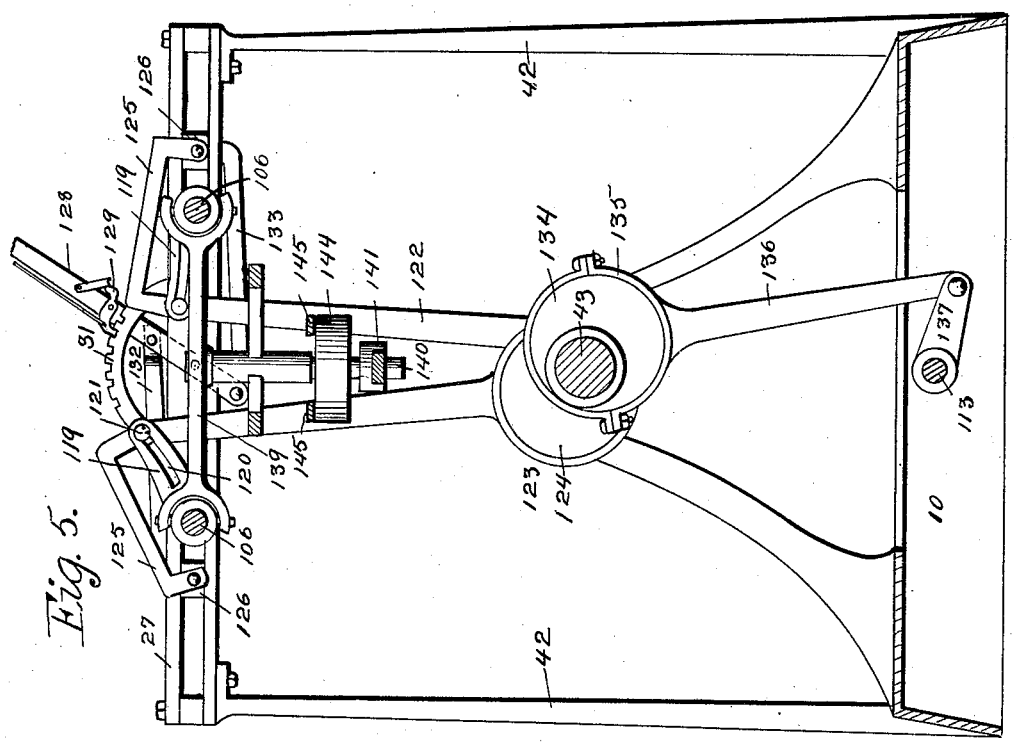
Witnesses
A. G. Hague
S. F. Christy.
Inventor Orin Williams
By Orwig & Lane Att'ys No. 828,259. PATENTED AUG. 7, 1906.
O. WILLIAMS.
ROTARY ENGINE.
APPLICATION FILED JAN. 7, 1905.
6 SHEETS—SHEET 6.
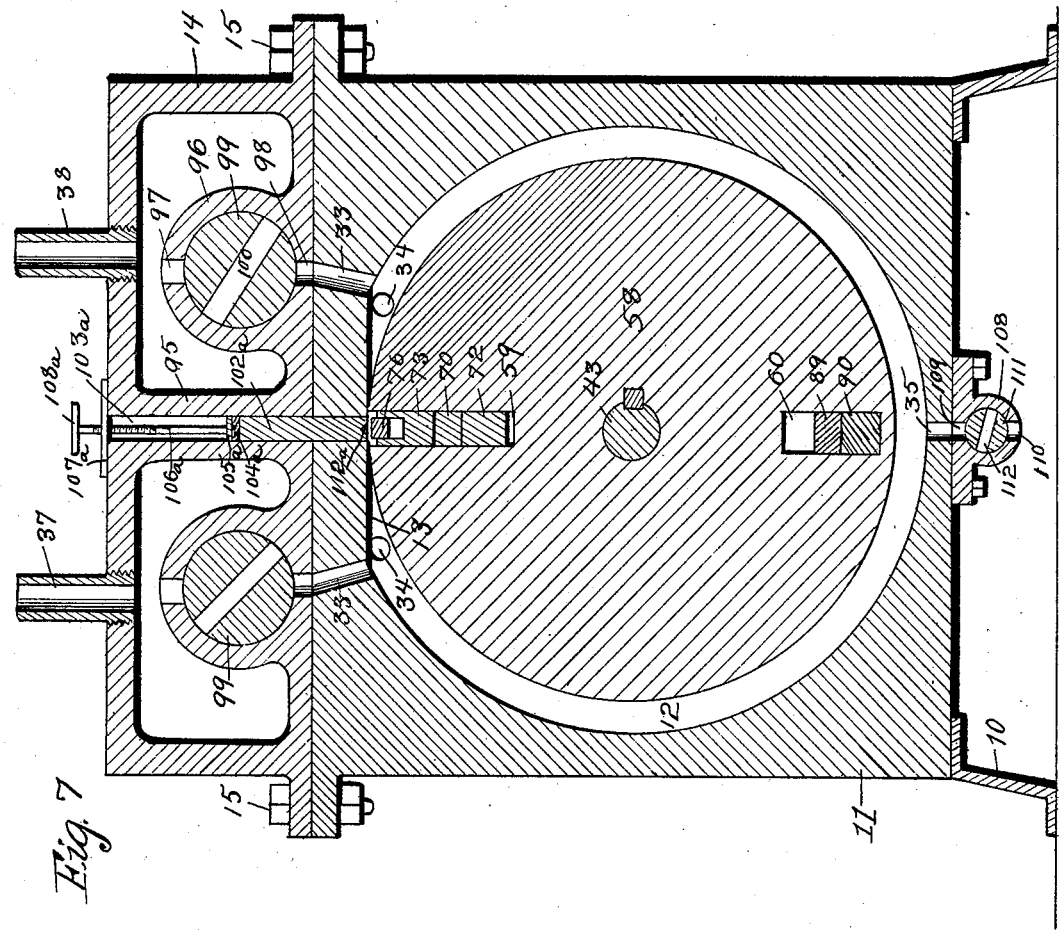
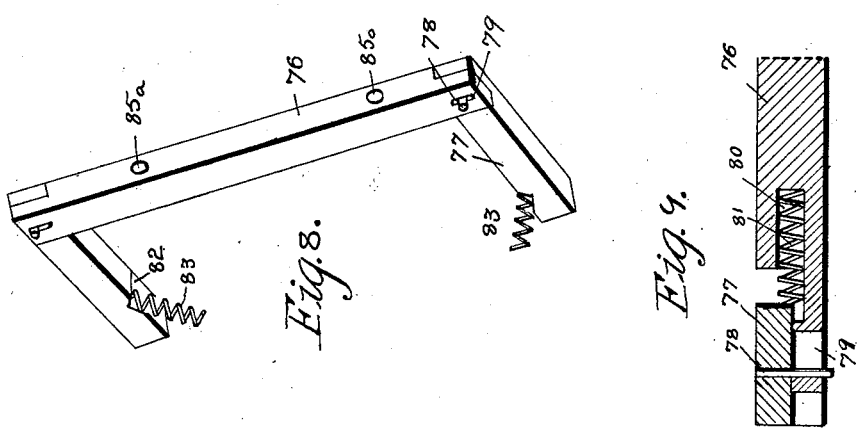
Witnesses
C. G. Hague
S. F. Christy
Inventor Orin Williams
By Orwig & Lane Attys

UNITED STATES PATENT OFFICE.

ORIN WILLIAMS, OF DES MOINES, IOWA, ASSIGNOR OF ONE-HALF TO J. R. HOWIE AND ONE-EIGHTH TO H. M. CHASE, OF BROOKLYN, IOWA.

ROTARY ENGINE.

No. 828,259.      Specification of Letters Patent.      Patented Aug. 7, 1906.

Application filed January 7, 1905. Serial No. 240,035.

*To all whom it may concern:*

Be it known that I, ORIN WILLIAMS, a citizen of the United States, residing at Des Moines, in the county of Polk and State of Iowa, have invented certain new and useful Improvements in Rotary Engines, of which the following is a specification.

My object is to provide a rotary engine of simple, durable, and inexpensive construction.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a side elevation of the complete engine. Fig. 2 shows a top or plan view of same. Fig. 3 shows a vertical longitudinal sectional view of the complete engine with the valve-controlling mechanism omitted. Fig. 4 shows a sectional view on the line $x\,x$ of Fig. 3 looking to the right, the reversing-lever being omitted. Fig. 5 shows a sectional view on the line $x\,x$ of Fig. 3 looking to the left to show the valve-controlling mechanism. Fig. 6 shows a sectional view on the line 6 6 of Fig. 3 looking toward the left. Fig. 7 shows a vertical central transverse sectional view of the complete engine. Fig. 8 shows a detail perspective view of the packing device for the rotary piston. Fig. 9 shows a detail sectional view of same through one of the corners of the packing device. Fig. 10 shows an end view of one of the heads of the rotary piston-block, illustrating the link for connecting the rotary piston with its counterbalancing-weight. Fig. 11 shows a sectional view illustrating the inner face of the same device. Fig. 12 shows a detail longitudinal sectional view of the exhaust-valve and connected parts, and Fig. 13 shows a detail perspective view illustrating a portion of the exhaust-valve and the valve-stem adjacent thereto.

Referring to the accompanying drawings, I shall first describe the engine-frame.

The reference-numeral 10 indicates the machine-base. Mounted upon the central portion of this base is a rectangular engine-frame 11, the interior of which is formed cylindrical at 12, except for a horizontally-arranged portion 13 at its top. This part 13 forms a stop against which the steam presses when it expands during the operation of the engine, as will hereinafter appear. Mounted upon the top of the frame 11 is the steam-chest 14, secured in position thereon by the bolts 15. On each end of the cylinder is a cylinder-head 16, secured in position by the bolts 17. Each of said cylinder-heads is formed with an annular shoulder at 18 to receive the packing-rings hereinafter described. It is also formed with an annular shoulder 19 to receive a detachable stationary cam-block, as will hereinafter appear. Each cylinder-head is also formed with an annular chamber 20 beyond the shoulder 19, designed to serve as an oil-chamber. An oil-cup 21 communicates with the top of this oil-chamber, and a petcock 22 communicates with the bottom of the oil-chamber, by which the oil may be drawn off when desired. Mounted in each cylinder-head is a cam-block 23, fitted therein against the shoulder 19. This cam-block is formed on its inner face with a cam-groove 24, as clearly shown in Fig. 6, which cam-groove is circular, except for a horizontally-arranged portion at its top.

The numeral 25 indicates an oil-duct formed in the cam-block 23 to provide communication between the oil-chamber 20 and the cam-groove 24, so that the said cam-groove may be constantly lubricated. I have also provided means for lubricating the interior of the cylinder-head 16 adjacent to the shoulder 18 as follows: 26 indicates an oil-cup communicating with a tube 27, which tube discharges to the interior of the cylinder-head adjacent to the shoulder 18 to lubricate the packing-rings on the rotary piston-head, hereinafter described.

In each of the cylinder-heads I have formed a packing-box 28 to receive the packing 29, and a packing-box sleeve 30 is screwed into the packing-box 28 to engage the packing 29. Both the packing-box and the sleeve are provided with a smooth central opening to receive the engine-shaft.

On each end of the base 10 is a standard 31 to support the end of the engine-shaft, and between the supports 31 and the adjacent ends of the engine-cylinder are the standards 32, which form additional supports for the engine-shaft, as will hereinafter appear.

Formed in the top of the engine-body adjacent to the opposite ends of the part 13 are the steam-induction ports 33, and formed in one of the cylinder-heads are the auxiliary ports 34, adjacent to the induction-ports 33, slightly closer to the longitudinal head of the engine than the induction-ports. At the bottom of the engine-body is an exhaust-port 35.

The numeral 36 indicates a steam-supply main having two branches 37 and 38 communicating with the top of the steam-chest. Each of said branches is controlled by a hand-valve, (indicated by the numerals 39 and 40.) Formed on one end of the steam-chest are the cone-shaped extensions 41 to receive and support the valve-stems for the inlet-valves, as will hereinafter appear.

Near one end of the frame 10 is a standard 42 to receive and support the valve-controlling mechanism hereinafter described.

*The rotary piston.*—The numeral 43 indicates the engine-shaft. It is supported at its ends in the standards 13. On each end of the shaft is a bearing-block 44, mounted in the standard 31 and adjustable vertically by the wedge 45 at its bottom and the set-screws 46 at its top and adjustable horizontally by the set-screws 47 at one end and the set-screws 48 at the other end. The shaft is supported at points adjacent to the ends of the engine-cylinder as follows: At each end of the engine in the standards 32 are two pillow-blocks 49. Each is made vertically adjustable at its end in the standards by the wedges 50. Mounted upon each pillow-block 49 adjacent to its center are the two bearing-boxes 51, arranged to slide longitudinally on the pillow-block 49. Each bearing-block 51 is provided with an oil-cup 52, and I have arranged for adjusting the bearing-blocks longitudinally upon the pillow-block as follows: In each bearing-block I have fixed a rod 53, which is extended outwardly and screw-threaded at its outer end. This screw-threaded outer end is passed through a slot in the adjacent standard 32, and a nut 54 is mounted on the screw-threaded portion to engage the inner face of the standard 33, and thus provide means for adjusting the bearing-block 51, to which it is attached, inwardly toward the center of the pillow-block. In each pair of the bearing-blocks 51 is a short shaft 55, upon which is fixed a shaft-supporting disk 57. The said disks when properly adjusted will engage the shaft 43 and hold it accurately in line. It is desirable that the said disks be adjusted in such a way that each will bear with equal pressure upon the shaft, and this may easily be done by adjusting the bearing-blocks to and from the center of the pillow-blocks and by adjusting the ends of the pillow-blocks by means of the wedges 50. A similar shaft-supporting device is located at each end of the engine-body.

Mounted upon the shaft 43 within the engine-cylinder is a cylindrical piston-block 58 of a size to closely approach the part 13 of the cylinder and to form with the cylinder a steam-valve of annular form except at the point where it comes close to the part 13. This piston-block is formed with a radial piston-chamber 59, said chamber extending from one end of the piston-block to the other. It is also formed with a radial chamber 60 at a point diametrically opposite from the chamber 59 to receive a counterbalancing-weight for the piston, hereinafter described. On each end of the piston is a piston-block head 61. This head is designed to fit into the shoulder 18 of the cylinder-head 16 and to rotate therein. It is firmly connected with the piston-block by the screws 62, and formed on its outer periphery is a shoulder to receive the annular packing-ring 63, which fits into the shoulder 18 of the cylinder-head. On the periphery of the head 61 are two packing-rings 64 between the packing-rings 63 and the inner face of the head 61, and beneath the packing-rings 64 is a relatively wide packing-ring 65, extending around the block 61 and engaging the packing-ring 61 at one edge, the other edge being flush with the inner face of the block 61. The packing-ring 63 is firmly held in place by means of the screws passed through into the head 61. In this way the packing-rings 64 and 65 are securely held in place. The said rings 63, 64, and 65 are arranged to prevent the escape of steam from the steam-chamber of the engine outwardly around the periphery of the block 61. Each of the blocks 61 is also formed with an angular chamber 67 near its outer face communicating with an angular chamber 68 of larger size near its inner face, and at a point diametrically opposite the said chambers 67 and 68 is another chamber 69, extending from the inner to the outer faces of the head 61.

The rotary piston is formed of an angular bar 70, extended through the piston-chamber 59, through the chambers 68 and 67 at both ends, and into the cam-grooves 24 at both ends. Rotatably mounted on the ends of this bar 70 are the antifriction-rollers 71, traveling in the cam-grooves 24. Said rollers are of a size to accurately fit in said grooves. Secured to the outer face of the part 70 is the rotary piston-body portion 73. The parts 70, 72, and 73 are detachably connected by means of the screws 74. The part 73 is formed with an angular groove 75 at its ends and outer face to receive a packing device, which device is clearly illustrated in Figs. 8 and 9. The packing device comprises a bar 76, inserted in the outer portion of the groove 75, and two short bars 77, inserted in the end portions of the groove 75. The bars 77 are slidingly connected with the bar 76 by means of the bars 78, secured to the bars 77 and passed through the slots 79 in the bar 78. The adjacent ends of the bars 76 and 77 are cut away to form a mortise-joint, as clearly shown in Fig. 8. I have provided means for holding the outer ends of the bars 77 to their outward limit of movement as follows: On the interior of each end of the bar 76 I have formed a recess 80 to receive an extensible coil-spring 81, which spring has one end in engagement with the adjacent portion of the bar 77 to normally hold it to its outer limit of movement. I have also provided means for holding the inner ends of each of the bars 77 to its limit of movement, both outwardly toward the end of the piston and outwardly toward the periphery of the piston-block, by forming notches 82 on the inner faces of the bars 77 and placing extensible coil-springs 83 against said notches with the inner ends engaging the adjacent portion of the rotary piston, said springs extending at angles of about forty-five degrees from the center of the piston-block outwardly. In this way the two springs 83 are made to hold the lower ends of the bars 77 in the desired position. I have also provided means for supporting the bar 76 on the rotary piston as follows: The numeral 84 indicates two screws with their heads sunk into the openings 85 in the bar 76 and their body portions passed through openings in the part 73 of the rotary piston and their ends seated in the ends of the screws 74, as clearly shown in Fig. 3. Extensible coil-springs 85 are placed on said screws 84 with their inner ends resting upon the screws 74 and their outer ends bearing upon the inner surfaces of the bars 76. In this way a yielding pressure outwardly is applied to the bar 76, and this movement outwardly is limited by the heads of the screws 84. The said packing device prevents the passage of steam through the cylinder 12 around the rotary piston. The rotary piston is necessarily movable radially of the piston-block in order to avoid striking the part 13 of the cylinder. When the piston-block is rotated at a high speed, the action of centrifugal force would tend to cause the piston to press outwardly with considerable force, and this outward pressure is objectionable, as it causes undue friction. I have provided for counterbalancing this centrifugal action as follows: Mounted upon each end of the shaft 70 is a link 86, said link designed to slide in a groove 87, formed for it on the outer face of the head 61. The central portion of the link is formed with an opening 88 to receive the shaft 43, and at the other end of the link is a shaft 89, passed through the opening 69 in the head 61, and fixed to the shaft 89 is a counterbalancing-weight 90, held in place by the screws 91, said weight resting in the opening 60 in the rotary block. The said counterbalancing-weight is designed to balance the weight of the rotary piston, and by this arrangement it is obvious that the piston may be made to slide radially by the cam-groove and roller operating therein with a minimum of friction—that is to say, the centrifugal action when the piston is rotating at high speed will be practically nullified. In this connection I have provided means for preventing the escape of steam from the steam-chamber through the openings 67 and 68 as follows: Fixed to each end of the shaft 70 is a small block 92, sliding in the opening 67, and adjacent thereto is a larger block 93, sliding in the opening 68. A packing device 94 is interposed between these blocks 92 and 93. In this connection it is to be understood that the blocks 92 and 93 are at their inner limit of movement at all times, except when the roller 71 is in engagement with the straight portion of the cam-groove in which it works, and when the roller is at this portion of its movement the steam is cut off—that is to say, there is no steam-pressure surrounding the rotary piston, as the straight portion of the cam-groove and the part 13 of the engine-cylinder are located between the induction-ports. Therefore it is only necessary to provide for preventing the escape of steam around the blocks 92 and 93 when they are at their outer limit of movement. By the construction shown and assuming the blocks 92 and 93 are at their outer limit of movement it is obvious that the block 93 will have its outer face close to the shoulder between the openings 67 and 68, both at its outer and its inner ends, and as the steam-pressure is outwardly upon the plate 93 a steam-tight joint will be formed between the edges of the outer face of the block 93 and the adjacent portions of the shoulder between the openings 67 and 68, and the packing device 94 will prevent the passage of steam between the blocks 92 and 93. It is necessary to provide for preventing the entrance of steam into the opening 60, because the steam-pressure is equal on all sides of said opening, and it does not matter whether steam enters it or not.

*Steam inlet and exhaust.*—I have provided means for introducing steam to the engine as follows: The steam-chest is divided by a central vertical partition 95 to form two independent chambers in each of which is a cylindrical chamber 96, provided with an inlet-opening 97 at its top and an outlet 98 at its bottom, said outlet communicating with the induction-port 33. Within this cylindrical chamber 96 is a rotary valve 99, provided with a steam passage-way 100, capable of providing communication between said ports when turned to position in alinement therewith. In one end of each valve 99 is a slot 101, said slot arranged to stand vertically when the passage-way 100 is at such an angle as to shut off the passage-way from the opening 97 to the opening 98, as illustrated in Fig. 13. On one end of the valve 99 is a set-screw 102, seated in the valve and engaging the adjacent portion of the steam-chest. The opposite end of the steam-chest adjacent to the valve 99 is provided with a detachable plate 103, formed with a packing-box 104 and an adjustable cap 105. The valve-stem 106 is passed through the cap and packing-box and formed with a cross-head 107 on its end designed to enter the slot 101 and freely slide longitudinally therein. The advantage of this construction of valve is as follows: When the valve is in its closed position to cut off communication through it, the cross-head 107 is substantially vertical, and, assuming that there is a considerable steam-pressure on the top of the valve, this pressure will hold the lower part of the valve firmly against its seat at the bottom of the valve-casing and no downward pressure will be applied to the valve-stem 106. The said valve 99 may be freely turned by a rotation of the valve-stem 106; but at all points throughout the movement of the valve 99 it is firmly held by steam-pressure from above against its valve-seat to avoid leakage, and all strains upon the valve-stem itself are avoided. The screw 102 provides for adjusting the valve to position where the head 107 will enter the slot 101. At the bottom of the engine-cylinder is an exhaust-valve chamber 108, provided with an inlet-opening 109 at its top, communicating with the exhaust-port 110. Within the valve-casing is a rotary valve 111, provided with a steam passage-way 112, which may be placed in position to provide communication between the ports 109 and 110. This exhaust-valve is connected to and operated by a valve-stem 113, which passes through a screw-cap 114, seated in a packing-box 115. As before stated, there are two auxiliary ports 34, located adjacent to the inlet-ports 33. Each of these ports 34 communicates with a valve 116, which discharges to the outside atmosphere and is controlled by a lever 117, which lever is automatically moved in a manner hereinafter described.

Between the two inlet-ports 33 I have provided a packing-plate 102ª, mounted in a vertically-arranged groove 103ª. Its lower end is designed to stand approximately flush with the lower central portion of the part 13 of the engine. This packing-plate 102ª is yieldingly held downwardly against the rotary piston-block by means of a yielding strip 104ª on top of the placing-plate and a bar 105ª on top of the yielding strip. Said bar is engaged at its central portion by an adjustable screw 106ª, seated in a cross-piece 107ª and provided with a hand-wheel 108ª for turning it. I have provided for lubricating the lower end of the packing-plate 102ª as follows: The numeral 109ª indicates oil-cups provided with tubes 110ª, which tubes discharge into ducts 111ª in the packing-plate, which ducts in turn discharge into a V-shaped notch 112ª in the longitudinal center of the bottom of the packing-plate. This packing-plate serves to prevent the escape of steam beneath it in either direction, and it is always held firmly against the piston-block or the rotary piston itself.

*Valve-controlling devices.*—As before explained, there are two valve-stems 106, and I have provided means for automatically operating either one of these valve-stems while the other is idle or of throwing both of them out of operation, as required, to control the engine and to reverse it, as follows: On each valve-stem 106 is a rotatable clutch member 118, having a curved arm 119, projecting upwardly and inwardly therefrom and formed with a curved slot 120. In this curved slot is a pin 121, carried by an arm 122, which arm is fixed to an eccentric-strap 123, mounted on an eccentric 124 on the shaft 43, so that the said arm is reciprocated during the rotation of the shaft. If the pin 121 is at the outer end of the slot 120, an up-and-down movement of the arm 122 through a given length of stroke will rotate the valve-stem 106 a relatively slight amount, while if the pin 121 is moved to position nearer the valve-stem 106 and the same length of stroke imparted to the arm 122 obviously the valve-stem will be rotated through a greater arc, and hence by controlling the position of the pin 121 in the slot 120 the point at which the valve 99 will cut off may be controlled and steam may be admitted to the engine through any desired portion of the piston-stroke. I have provided for moving the pin 121 in its slot 120 as follows: Fixed to each of the pins 121 is a link 125, connected to a sliding block 126, mounted in the track 127 on the standards 42. I have provided for adjusting these blocks 126 as follows: The numeral 128 indicates a controlling-lever fulcrumed to a suitable support and provided with a spring-actuated pawl 129, controlled by the lever 130. Said pawl engages the sector 131, fixed to a stationary support. Above the fulcrum of the lever 128 is a link 132, connected with one of the blocks 126. Obviously an adjustment of the lever 128 controls the position of the blocks 126 in the slots 120, so that the movement of both of the valves 99 is controlled by the same lever, no matter which one of said valves is in active use. Therefore if the engine is reversed at any time the point of cut-off of the valve 99 that is used after the reversal will be exactly the same as the point of cut-off of the other valve that was used before the engine was reversed. It is of course essential that the movement of the exhaust-valve 111 be timed accurately with relation to the movement of the valve in the steam-chest. I have therefore provided an eccentric 134, fixed to the shaft 43 and provided with an eccentric-strap 135, connected to an arm 136, which in turn is pivoted to an arm 137 on the valve-stem 113. In this way the exhaust and the induction valves will always operate in unison. I have provided for reversing the movement of the engine as follows: On each valve-stem 101 is a clutch member 138, slidingly and non-rotatably mounted on the valve-stem and designed to engage the adjacent clutch member 118. These two clutch members 138 are each connected with a lever 139, fixed to a vertical shaft 140. On the lower end of the shaft 140 is an arm 141, and a link 142 is connected to said arm and to a lever 143, fulcrumed to the machine-frame near its base. By this arrangement it is obvious that a manipulation of the lever 143 will serve to throw either one of the clutch members 138 into engagement with the mating clutch member 118, or when the lever is stopped on a median line both clutches 138 are out of engagement, as shown in Fig. 2, and the valves will not be operated. In this connection it is important that the auxiliary exhaust-valves 116 be opened at the same time that the engine is reversed, and I accomplish this by fixing a wheel 144 on the shaft 140 and pivoted two arms 145 to opposite sides of said wheel and to the levers 117, that control the valves 116. By this arrangement when steam is admitted through the valve of the steam-chest on one side of the engine the auxiliary exhaust-valve on the other side of the engine will be opened, and vice versa.

*Practical operation.*—When it is desired to operate the engine, the valves 39 and 40 are opened. Then the lever 143 is set to one limit of its movement, thus throwing one of the clutches 138 into engagement with its mating clutch 118. The introduction of steam into the cylinder will cause the engine-shaft 43 to rotate slightly, and this will actuate the valve-shaft 101, the clutches on which are in engagement with each other. Assuming that the rotary piston is standing in a substantially horizontal position and assuming, further, that steam is admitted through the port between the piston and the part 113, obviously the rotary piston-block would be turned under the boiler-pressure of the steam until the valve 99 was cut off. Then the steam would expand until the exhaust-port was opened and the rotary piston had passed it. Then the air in the cylinder in advance of the rotary piston may discharge through the auxiliary exhaust-valve, and the engine continues to rotate in the same direction as long as the reversing-lever remains in this position, and steam is admitted to the engine. The engine may be stopped either by moving the reversing-lever to a position where both pairs of clutches 118 and 138 are out of engagement, as shown in Fig. 2, or it may be stopped by closing the valves 39 and 40. The engine may be reversed in its movement by moving the reversing-lever to its opposite limit and throwing in the other pair of clutches 118 and 138, whereupon the movement of the rotary piston-block will be in the opposite direction. This reversing-lever may be thrown with perfect safety from one limit of its movement to another while the engine is rotating in either direction. Assuming that it is desired to have the steam admitted to the cylinder at boiler-pressure for a relatively great length of the piston-stroke, then the controlling-lever 128 is moved to position, where it will force both of the blocks 126 to their outer limit of movement, thus bringing both pins 121 to position adjacent to the clutches 118, whereupon the valves 99 will be held open through a relatively long portion of the piston-stroke. This controlling-lever may also be moved with perfect safety to any position within its limit of movement while the engine is running in either direction. By the arrangement of the counterbalancing-weight on the rotary piston the said piston is balanced to reduce the friction on its rollers to a minimum, for when the rotary piston-block is rotating at a relatively low rate of speed the weight of the piston is counterbalanced by the weight 90, so that the action of gravitation will not increase friction on the rollers 71. Then when the speed of rotation of the rotary piston-block is considerable then the outward thrust of the piston caused by the centrifugal action will be counterbalanced by a corresponding centrifugal action applied to the weight 90, so that under all conditions of movement the friction upon the rollers 71 is minimized.

All of the parts of the engine which are subjected to wear or might need replacement are readily accessible. All of the points at which there might be loss of power by reason of escaping steam are protected against leakage of steam, and all of the parts which are subjected to considerable wear are constantly lubricated to reduce the wear to a minimum. The construction of the valves 99 and their connection with the valve-rods 106 provides means by which the valves are constantly held firmly to their seats by steam-pressure from above, and at the same time the valve-stems are tightly packed to prevent leakage of steam, and all downward pressure upon the valve-stems is obviated.

By reason of the peculiar construction of my engine, before described in detail, it is possible to construct a cylinder of relatively great interior diameter and provide a cylindrical piston-block of relatively great diameter, thereby forming a steam-chamber of great length from the point where the steam is admitted to the point where it ultimately escapes, and yet the steam-chamber is of very slight size transversely. However, the part of the piston which is engaged by the steam is located a relatively great distance from the engine-shaft, so that the pressure of steam applied to the piston will be ultimately applied to the shaft to greatly increase the degree on account of the long leverage of the piston-block, and in this way a relatively small amount of steam under pressure will develop a relatively great amount of power.

I claim as my invention—

1. In a rotary engine, a body portion formed with a cylindrical chamber open at its ends, a cylinder-head on each end of the body portion, formed with a cam-groove on its inner face, an oil-reservoir communicating with the cam-groove, an oil-inlet at the top of the reservoir, a pet-cock in the bottom of the reservoir, and a rotary piston guided by the cam-groove.

2. In a rotary engine, a body portion formed with a cylindrical chamber open at its ends, a cylinder-head on each end of the body portion, a block formed with a cam-groove on its inner face, mounted in the cylinder-head, and forming with the cylinder-head, an oil-reservoir, said block provided with a duct communicating between the reservoir and the cam-groove, and a rotary piston guided by the cam-groove.

3. In a rotary engine, a body portion formed with a cylindrical chamber open at its ends, a cylinder-head on each end of the body portion formed with an annular shoulder to receive a rotating piston-block and also with an annular shoulder to receive a cam-groove block and also with an oil-reservoir, a block formed with a cam-groove mounted in the cylinder-head, in engagement with the shoulder provided for it, forming with the cylinder-head an oil-reservoir and provided with an oil-duct communicating between the reservoir and the cam-groove, and a rotary piston-block mounted in the cylinder to engage the annular shoulder formed on the cylinder-head.

4. In a rotary engine, a body portion formed with a cylindrical chamber, a cylinder-head formed with an annular shoulder adjacent to the cylindrical body portion, a rotary piston-block head fixed to the cylindrical piston-block, and packing-rings on the cylindrical piston-block head in engagement with the annular shoulder of the cylinder-head.

5. In a rotary engine, a body portion formed with a cylindrical chamber having a staight portion near its top, a cylinder-head fixed to the body portion and formed with an annular shoulder adjacent to the cylindrical body portion, a cylindrical piston-block mounted in the body portion, a detachable piston-block head fixed to the cylindrical piston-block, an annular packing-ring mounted at the outer periphery of the piston-block head to engage the annular shoulder of the cylinder-head and extending from the aforesaid packing-ring to the inner face of the piston-block head, and two annular packing-rings on top of the last-mentioned packing-ring.

6. In a rotary engine, a body portion formed with a cylindrical chamber having a straight portion near its top, a cylinder-head fixed to the body portion and formed with an annular shoulder adjacent to the cylindrical body portion, a cylindrical piston-block mounted in the body portion, a detachable piston-block head fixed to the cylindrical piston-block, an annular packing-ring mounted at the outer periphery of the piston-block head to engage the annular shoulder of the cylinder-head and extending from the aforesaid packing-ring to the inner face of the piston-block head, two annular packing-rings on top of the last-mentioned packing-ring, said cylinder-head formed with an oil-duct discharging to said packing-rings.

7. In a rotary engine, a body portion formed with a cylindrical chamber, cylinder-heads formed with cam-grooves on their inner faces, a rotary piston-block, a radially-movable piston carried by the piston-block, a shaft supporting the piston and projected into the cam-grooves and sliding plates carried by the piston-shaft to prevent the escape of steam around the piston-shaft in the direction of the cam-grooves.

8. In a rotary engine, a body portion formed with a cylindrical chamber, a cylinder-head formed with a cam-groove on its inner face, a rotary piston-block, a head detachably secured to the rotary piston-block, and formed with an angular opening, said opening having a shoulder formed therein, a sliding piston, a shaft supporting the sliding piston projected through the piston-block head into the cam-groove, and a sliding plate fixed to the shaft and resting against the shoulder in the opening of the piston-block head.

9. In a rotary engine, a body portion formed with a cylindrical chamber, a cylinder-head formed with a cam-groove at its inner face, a rotary piston-block, a piston-block head fixed to the rotary piston-block and formed with an opening therein, said opening having a shoulder near its central portion, a sliding piston in the piston-block, a shaft supporting the sliding piston and projecting into the cam-groove through the opening in the piston-block head, a relatively small plate fixed to the piston-shaft and supported in the outer part of the opening in the piston-block head, a relatively large plate fixed to the piston-shaft and supported at the inner portion of the piston-block head in engagement with said shoulder, and a packing device surrounding the piston-shaft and interposed between said plates.

10. In a rotary engine, a rotating piston-block formed with an opening to receive a piston, a piston in said opening, comprising a central shaft, a part adjacent to the inner surface of the shaft, a part adjacent to the outer surface of the shaft, and screws passed through said inner part, through the shaft and into the outer part.

11. In a rotary engine, a rotating piston-block formed with an opening to receive a piston, a piston in said opening, comprising a central shaft, a part adjacent to the inner surface of the shaft, a part adjacent to the outer surface of the shaft, screws passed through said inner part, through the shaft and into the outer part, a packing-bar adjacent to the outer edge of the piston, screws passed through the packing-bar and seated in the outer ends of the aforesaid screws, and extensible springs mounted on the latter screws normally holding the packing-bar to its outer limit of movement.

12. In a rotary engine, the combination of a cylinder and rotary piston-block, of a radially-movable piston formed with a groove at its ends and outer edge, a packing-bar slidingly mounted in the groove at the edge of the piston, and two packing-bars mounted in the grooves at the ends of the piston, slidingly connected with the bar at the outer edge of the piston, springs for holding the end bars at their outer limit of movement relative to the bar in the edge of the piston, and independent springs for holding the inner ends of the end bars to their outer limit of movement.

13. In a rotary engine, a rotating piston-block, a piston slidingly supported in the piston-block and formed with a groove in its outer edge and its ends, a packing-bar slidingly mounted in the edge groove of the piston, two packing-bars slidingly mounted in the end groove of the piston, and two extensible coil-springs, each having one end resting upon the piston and extended outwardly radially and outwardly toward the end of the rotary piston-block, its outer end engaging the end packing-bars, said springs yieldingly holding the end packing-bars to their limit of movement toward the ends of the rotary piston-block and toward the periphery of same.

14. A rotary engine, comprising a cylindrical body portion having a flat surface on its interior, a rotary piston-block, a radially-movable piston carried by the rotary piston-block, a counterbalancing-weight carried by the rotary piston-block and connected with the piston.

15. In a rotary engine, a rotary piston-block, a radially-movable piston at one side of the piston-block, and a counterbalancing-weight carried by the rotary piston-block diametrically opposite from the rotary piston and connected therewith.

16. In a rotary engine, a piston-block formed with a radial groove at one side and a radial groove at the opposite side, a radially-movable piston in one groove and a radially-movable weight in the other groove, and means for connecting them.

17. In a rotary engine, a rotary piston-block formed with a radial groove in one side, a radial groove at a point diametrically opposite from the first and with grooves in its ends, a radially-movable piston in one of the radial grooves, a radially-movable weight in the other, and links mounted in the end grooves, connecting the piston and weight.

18. In a rotary engine, a cylindrical body portion formed with a flat surface on its interior and also formed with a slot open at the central portion of said flat surface, a packing-plate slidingly mounted in said slot, a yielding strip on top of the packing-plate, a rigid bar on top of the yielding strip, and a screw engaging the top of the rigid bar to force the packing-plate downwardly, and a rotary piston-block in the cylinder engaged by said packing-plate.

19. In a rotary engine, a cylindrical body portion formed with a flat surface on its interior and also formed with a slot open at the central portion of said flat surface, a packing-plate slidingly mounted in said slot, a yielding strip on top of the packing-plate, a rigid bar on top of the yielding strip, and a screw engaging the top of the rigid bar to force the packing-plate downwardly, and a rotary piston-block in the cylinder engaged by said packing-plate, said packing-plate also formed with oil-ducts extending vertically through it and with a U-shaped groove at its lower end communicating with the oil-ducts, and oil-cups communicating with the said oil-ducts.

20. In an engine, the combination of a rotatable engine-shaft, two independent valves for controlling the admission of steam to the engine, one operating to drive the engine in one direction and the other in a reverse direction, means driven by the engine-shaft for actuating either one of said valves, a lever, and means actuated by the lever for controlling the period of cut-off of both valves, so that when either valve is used, the period of cut-off will be the same, 21. In an engine, the combination of a rotatable engine-shaft, two independent valves for controlling the admission of steam to the engine, one operating to drive the engine in one direction and the other in a reverse direction, means driven by the engine-shaft for actuating either one of said valves, a lever, and means actuated by the lever for controlling the period of cut-off of both valves, so that when either valve is used, the period of cut-off will be the same, and independent means for throwing either one of the valves into operation and the other out of operation without affecting the cut-off-controlling means.

22. In a rotary engine, the combination of an engine-shaft, a rotary piston thereon, two rotary valves controlling the admission of steam to the engine, one for turning the piston in one direction and the other in a reverse direction, a valve-stem for each of said valves, a rotatable clutch on each valve-stem, a sliding clutch on each valve-stem, a slotted arm on each rotary clutch formed with a slot, an eccentric arm slidingly mounted in the slot of each slotted arm, an eccentric-strap connected with each eccentric-arm, an eccentric fixed to the engine-shaft and operating in each eccentric-strap, two sliding blocks, links connected with the sliding blocks and also with the ends of the eccentric-arms that are in the slotted arms, a single lever for moving both of said sliding blocks at the same time, a reversing-lever, and means actuated by this reversing-lever for throwing either one of the sliding clutches into engagement with its mating rotary clutch, and the other pair of clutches out of engagement at the same time.

ORIN WILLIAMS.

Witnesses:
J. R. HOWIE,
J. RALPH ORWIG.